Figure 4:
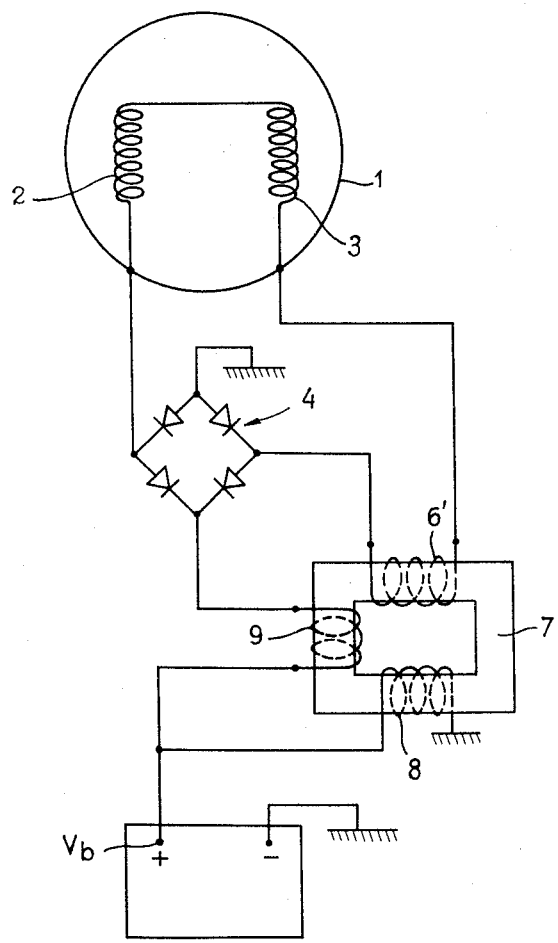

June 21, 1960  P. TORRE ET AL  2,942,170
BATTERY CHARGE REGULATOR
Filed July 8, 1958  2 Sheets-Sheet 1
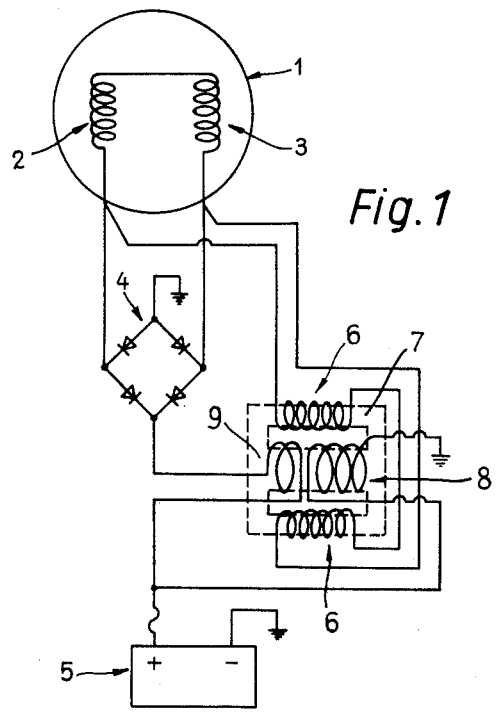
Fig.1
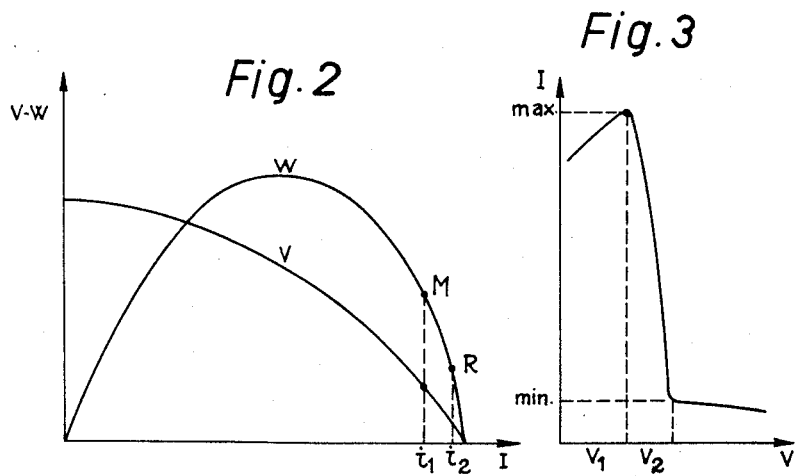
Fig.2
Fig.3

United States Patent Office 2,942,170
Patented June 21, 1960

2,942,170
BATTERY CHARGE REGULATOR

Pierluigi Torre and Brenno Primetti, Milan, Italy, assignors to Innocenti Societe Generale per l'Industria Metallurgica e Meccanica, Milan, Italy Filed July 8, 1958, Ser. No. 747,158

Claims priority, application Italy July 11, 1957

1 Claim. (Cl. 320—23)

Our invention relates to a circuit for feeding the battery-charging current on motor cycles, of the type comprising an alternating current generator, a current rectifier and a device for regulating the battery-charging current.

A circuit of this type is known, for example from our copending application Serial No. 626,469, now abandoned, filed December 5, 1956, in which the device for regulating the battery-charging current comprises an impedance connected across the terminals of the generator and means responsive to the storage battery voltage acting on said impedance to vary the value thereof in order to control the current delivered by the generator, hence the voltage across its terminals in accordance with the battery charge condition.

In the embodiment disclosed by said application the impedance comprises an ohmic resistance and the means responsive to the battery voltage acting on said impedance comprises a relay adapted to break or make the resistance circuit, the variation in impedance being therefore effected by the so-called "all or nil" method.

Our invention provides a modification of the above principle which affords substantial advantages over the device disclosed by the parent patent. More particularly, this invention provides a device deprived of moving parts and affording a higher sensitiveness in adjustment.

This device comprises an impedance of the inductive type wound on a magnetic core, the battery voltage responsive means comprising a winding connected across the battery terminals wound on the magnetic core in order to vary the saturation of the said core in accordance with the battery charge conditions.

Further advantages and characteristic features of this invention will be understood from the appended description referring to the accompanying drawings given by way of example, wherein:

Figure 1 shows the electric circuit of the device,

Figure 2 shows the electric characteristics of the alternating current generator, the ordinates axis giving the voltage in volts across the terminals and the power delivery in watts, the axis of the abscissae giving the intensity of the delivered current I in amperes, Figure 3 shows the electric characteristics of the battery charge, the axis of the ordinates giving the rectified charging current I, the axis of the abscissae the voltage in volts across the battery terminals, Figure 4 shows a modification of Figure 1.

The generator 1 is provided with two low voltage coils 2 and 3 interconnected in series. The alternating current generated therein is sent to a bridge rectifier 4 and converted to direct current for charging the battery 5.

A circuit is connected across the generator terminals including two coils 6 wound on the pillars of a shell-type laminated stack 7. The central core of the laminated stack has wound thereon two energizing coils, namely a thin wire coil 8 having a larger number of turns, connected at one end to the positive battery terminal and grounded at its opposite end, and a thicker wire coil 9 having a smaller number of turns in series with the circuit of the rectified current through which the latter current flows setting up a magnetic effect opposite the coil 8. More particularly, while the coil 8 tends to saturate the core, the winding 9 opposes this saturating effect, whereby the adjusting sensitiveness of the device can be improved. The charging circuit operates as follows. If the battery is being used, as when the headlights are on, or becomes partly discharged as a result of starting the vehicle, the voltage $V_1$ feeding the coil 8 is a low one (Figure 3), the magnetic flux generated thereby being insufficient for saturating the core.

Under these conditions, the full current delivered by the alternator is rectified (I max—Figure 3), and flows through the coil 9 to the battery.

On increase of the battery voltage to the value $V_2$ corresponding to full charge (Figure 3) the flux generated by the coil 8 increases likewise till at the predetermined voltage (2.75 v.) the core is fully saturated. Under these conditions, the impedance of both coils 6 is considerably lowered, thereby varying the current absorbed by the said coils from $i_1$ to $i_2$, the characteristic of the alternator goes from the maximum charge M to the reduced charge R in Figure 2, thereby reducing the intensity of the rectified current from I max, to I min. (Figure 3).

The above operating conditions can be fulfilled by virtue of the peculiar external characteristics of the alternator (Figure 2) which is operated under normal operating conditions for maximum charge on the descending portion of the characteristic W at a point M such that a small variation in current intensity from $i_1$ to $i_2$ results in a high drop in voltage at its terminals (point R) for reduced charge.

The above described device maintains the advantage residing in that the rectifier is not continuously subjected to conversion of the full current from the alternator, the load on the rectifier thereon varying according to the battery charge.

Moreover, the self-adjusting features are maintained by the arrangement even where the circuit is deprived of a battery or the battery is damaged, whereby the feed voltage to the various utilising circuits is maintained constant on variation of the engine load and speed rate.

The winding in series on the adjusting device affords a high adjusting sensitiveness, though standard magnetic laminations are used for the shell-type laminated stack.

It will be understood that, though leaving the principle of the invention unaltered, embodiments and construction details can be widely varied from the example described and shown without departing from the scope of this invention.

In the modification shown in Figure 4 the induction winding, denoted in this case by 6', is connected in series between the generator 1 and rectifier 4 and is likewise wound on the core 7; the latter has further wound thereon, similarly to the previous embodiment, a winding 9 connected in series between the rectifier and battery and a winding 8 connected across the positive battery terminal. The winding 9, through which the battery charging current flows, has been calculated to saturate the core, when the charging current is at a maximum value corresponding to low battery voltage, but not to saturate the core when the battery voltage rises resulting in a decrease in charging current. The winding 8 in parallel with the battery acts in opposition to the winding 9 to implement the effect of the decrease in charging current in the winding 9 as the battery voltage increases.

What we claim is:

A battery charging device comprising an alternating current generator, a rectifier connected across the alternating current output terminals of the generator, a saturable magnetic core, a charging current winding on the core connecting the battery with a D.C. tap on the rectifier whereby the charging current is conveyed from the rectifier to the battery through the said winding, a voltage winding on the core connected across the battery terminals, the said voltage winding acting on the core in opposition to the charging current winding, and an impedance winding on the core having its ends connected to the respective alternating current output terminals on the generator in parallel relationship with the rectifier, the said voltage winding being capable of bringing the core to saturation upon increase of the battery voltage beyond a predetermined value thereby to reduce the impedance value of the said impedance winding.

References Cited in the file of this patent

UNITED STATES PATENTS

| | | |
|---|---|---|
| 2,693,540 | Huge | Nov. 2, 1954 |
| 2,758,272 | Franklin | Aug. 7, 1956 |

FOREIGN PATENTS

| | | |
|---|---|---|
| 1,082,203 | France | June 16, 1954 |
| 739,000 | Great Britain | Oct. 26, 1955 |